United States Patent [19]

Morris

[11] 4,299,847

[45] Nov. 10, 1981

[54] PROCESS FOR TREATING CEREAL GRAINS

[76] Inventor: William F. Morris, 3112 Bagley Ave., Los Angeles, Calif. 90034

[21] Appl. No.: 179,369

[22] Filed: Aug. 18, 1980

Related U.S. Application Data

[63] Continuation-in-part of Ser. No. 60,653, Jul. 25, 1979, abandoned, which is a continuation-in-part of Ser. No. 878,684, Feb. 17, 1978, abandoned.

[51] Int. Cl.$^3$ .............................................. A23L 1/10
[52] U.S. Cl. ...................................... 426/18; 435/267; 426/19; 426/28
[58] Field of Search .................. 435/267, 262; 426/18, 426/28

[56] References Cited

U.S. PATENT DOCUMENTS

| | | | |
|---|---|---|---|
| 1,172,270 | 2/1916 | Franzie | 426/18 |
| 2,494,544 | 1/1950 | Erlich | 426/18 |
| 3,172,766 | 3/1965 | Larebeyrette | 426/18 |

OTHER PUBLICATIONS

Pyler, Baking Science & Technology, 1973, vol. 1, Siebel Publ. Co.: Chicago, pp. 201–206.
Grant, Hackh's Chemical Dictionary, 4th Ed., 1972, McGraw-Hill Book Co.: New York, pp. 282, 386.
Lietze, Annals of Allergy, vol. 27, 1969, pp. 9–12.
Vande Kamer et al, Quarterly Rev. of Allergy & Applied Immunology, vol. 9, 1955, p. 171
Roberts, The Journal of Allergy, vol. 27, 1956, pp. 523 to 530.

*Primary Examiner*—Joseph M. Golian
*Attorney, Agent, or Firm*—Donald Diamond

[57] ABSTRACT

A process is provided for treating cereal grain which comprises soaking cereal grain in an aqueous medium containing crystalline fructose or liquid grape concentrate for about 10 to about 16 hours at a temperature from about 72° to about 84° F. and then adding proteolytic enzyme to the soaking mixture with continued soaking in the same temperature range for an additional 10 to 62 hours and thereafter separating the cereal grain from the soaking mixture. Baked products prepared from an ingredient mix containing the treated cereal grain have hypoallergenic characteristics.

10 Claims, No Drawings

PROCESS FOR TREATING CEREAL GRAINS

CROSS-REFERENCE TO RELATED APPLICATION

This application is a continuation-in-part of U.S. Patent application No. 060,653, filed July 25, 1979 and entitled Process For Treating Cereal Grains, now abandoned; U.S. Patent Application 060,653 is a continuation-in-part of U.S. Patent Application 878,684, filed Feb. 17, 1978 and entitled Process For Treating Cereal Grain, now abandoned.

BACKGROUND OF THE INVENTION

This invention relates to cereal grain and, more particularly, to a process for treating cereal grain whereby baked products prepared from the treated grain have hypoallergenic characteristics.

The population comprises a small, but significant number of people, who are allergic to cereal grain products and, in particular, to wheat products. The consumption of these products by such persons produces moderate to severe symptoms of, for example, eczema, gastrointestinal allergy or asthma depending upon the degree of sensitivity of the individual. It would, of course, be desirable and advantageous to produce baked products from cereal grains which would be more readily tolerated by food sensitive persons.

SUMMARY OF THE INVENTION

In accordance with this invention, there is provided a method of treating cereal grain intended for use in the preparation of hypoallergenic consumable products, which comprises: (a) forming an initial soaking mixture containing water, cereal grain and crystalline fructose or liquid grape concentrate; (b) maintaining the initial soaking mixture at a temperature from about 72° to about 84° F. for an initial soaking period of about 10 to about 16 hours; (c) adding proteolytic enzyme to said initial soaking mixture upon completion of the initial soaking period to define a final soaking mixture and maintaining the final soaking mixture at a temperature from about 72° to about 84° F. for a final soaking period of about 10 to about 62 hours; and (d) separating the cereal grain from the final soaking mixture.

DETAILED DESCRIPTION

In the first step of the process, an initial soaking mixture is prepared containing cereal grain, crystalline fructose or liquid grape concentrate, and water. Cereal grains which can be used in forming the initial soaking mixture include, for example, oats, wheat, barley, rye, buckwheat, rice, maize, millet and mixtures thereof. The cereal grain is generally present in the initial soaking mixture in an amount from about 40 to about 60 wt.% and preferably in an amount from about 45 to about 55 wt.%.

The liquid grape concentrate which can be employed in the initial soaking mixture may be derived from any suitable grape source. While liquid grape concentrates are available from commercial suppliers having a solids content distributed over a broad range, it has been found to be advantageous to use a concentrate having a solids content generally from about 60 to about 75 wt.% and preferably from about 65 to about 70 wt.%. As is well known in the art, these solids comprise hexose sugars, tartaric acid, potassium bitartrate, tannin and other compositions naturally present in the fruit. The liquid grape concentrate is generally present in the initial soaking mixture in an amount from about 3 to about 8 wt.% and preferably in an amount from about 4 to about 6 wt.%.

The fructose which can be utilized in the initial soaking mixture is substantially pure crystalline fructose. In a preferred form, the crystalline fructose has a fructose content of at least about 99.5 wt.% and a moisture content of not more than about 0.25 wt.%.

Crystalline fructose is generally present in the initial soaking mixture in an amount from about 0.55 to about 0.85 wt.%.

The pH of the initial soaking mixture is advantageously from about 3.9 to about 5.4 and preferably from about 4 to about 5. Since the liquid grape concentrate and the crystalline fructose have an acid constituency, the addition of either of these compositions to the initial soaking mixture will generally provide it with a pH which is within the aforesaid range. However, food grade acids may be employed to appropriately adjust the pH, where desired.

The initial soaking mixture can be prepared in any suitable manner as, for example, by adding cereal grain and crystalline fructose or liquid grape concentrate, in appropriate amounts, to a defined quantity of water so as to obtain a soaking mix having the aforesaid concentrations, with the water being present in an amount to make up 100 wt.%. Following the formation of the initial soaking mixture, it is maintained at a temperature from about 72° to about 84° F. for an initial soaking period of about 10 to about 16 hours and preferably from about 12 to about 14 hours.

Upon completion of the initial soaking period, proteolytic enzyme is added to the initial soaking mixture to define a final soaking mixture. Examples of proteolytic enzyme which can be used include bromelin and papain. The bromelin which is used in the method of this invention generally has an enzyme potency of about 1400 to about 1600 gelatin digestive units per gram and is employed in the final soaking mixture in an amount from about 0.016 to about 0.024 wt.%. The papain which is used in the method of this invention generally has an enzyme potency from about 2800 to about 3000 gelatin digestive units per gram and is employed in the final soaking mixture in an amount from about 0.008 to about 0.012 wt.%.

The final soaking mixture is maintained at a temperature from about 72° to about 84° F. for a final soaking period of about 10 to about 62 hours. The length of the final soaking period is inversely proportional to the protein content of the cereal grain. In this connection, spring wheat, which has a portein content from about 14 to about 18 wt.%, requires a final soaking period of about 10 to about 20 hours; hard red wheat, which has a protein content from about 11 to about 13 wt.%, requires a final soaking period of about 36 to about 48 hours; and soft white wheat, which has a protein content from about 7 to about 10 wt.%, requires a final soaking period of about 56 to about 62 hours in order to obtain the advantages of this invention, i.e., the hypoallergenic characteristics of baked products prepared from the treated cereal grains.

Following the final soaking period, the treated cereal grain is separated from the final soaking mixture. The treated grain is then ground and used in accordance with conventional procedures for the preparation of food products. However, if the treated grain is to be stored for any significant length of time before being used in the preparation of such products, then it is subjected to a drying step.

It has been observed from shelf and incubator oven tests that hypoallergenic bread prepared from wheat treated in accordance with the aforesaid process supports a white mold growth and has selective resistance to the growth of green and dark colored mold which is customarily associated with bread prepared from conventionally processed wheat. Thus, the white mold growth is an analytical test which can be employed to show that the wheat has been sufficiently processed such that baked products prepared from the treated wheat have hypoallergenic characteristics.

The use of either liquid grape concentrate or crystalline fructose is critical in the treatment of the cereal grain in order to achieve the hypoallergenic benefits of this invention as shown analytically by mold growth color, since it has been found that when glucose, high fructose corn syrup, honey, or liquid fruit concentrates such as apple concentrate or pear concentrate are used in lieu of grape concentrate or crystalline fructose the selected resistance to the growth of green and dark colored mold is not attained.

The hypoallergenic features of this invention may be further enhanced by adding an amylolytic enzyme such as diastase yeast or diastase malt to the final soaking mixture. The amylolytic enzyme, which should have an enzyme potency of about 1800 to about 2000 starch digestive units per gram, may be included in the final soaking mixture in an amount from about 0.1 to about 0.5 wt.%.

The following examples further illustrate the invention.

EXAMPLE I

This example illustrates the selective inhibition of green and dark colored mold growth on bread prepared from wheat treated in accordance with the liquid grape concentrate embodiment of this invention.

An initial soaking mixture was prepared by adding 8 pounds of spring wheat kernels and one pound of liquid grape concentrate identified as Grape White, Standard and containing 0.68 pound of solids to a holding vat containing ten pounds of water. The pH of the water following the addition of the wheat kernels and the grape concentrate was approximately four. The initial soaking mixture was maintained at a temperature within the range from 72° to 84° F. for an initial soaking period which lasted 10 to 12 hours.

Upon completion of the initial soaking period, 0.25 pound of bromelin solution containing 0.004 pound of bromelin having an enzyme potency of 1600 gelatin digestive units per gram was added to the initial soaking mixture to define a final soaking mixture. The final soaking mixture was maintained at a temperature within the range from 72° to 84° F. for a final soaking period of about 12 hours. At the end of the final soaking period, the liquid was strained from the wheat kernels.

The wheat kernels were then put through a NationalOsborne Food Chopper equipped with a perforated extrusion plate. The chopped grains were extruded in the form of ribbons of a dough-like substance which coalesced into a composite mass. The weight of this mass was approximately 13 pounds, indicating that the 8 pounds of wheat kernels had absorbed approximately 5 pounds of material during the course of the initial and final soaking periods.

Fifty batches of ground wheat dough, each weighing approximately 13 pounds, were prepared in accordance with the aforesaid procedure. Each 13 pound batch of ground wheat dough was further mixed with 0.36 pound of yeast, 0.8 pound of honey, 0.24 pound of sea salt and 0.24 pound of soybean oil to prepare a bread dough mix. From each batch of dough mix, 11 baking loaves were formed, baked and wrapped in accordance with conventional baking procedures. A first set of baked samples from each batch was placed on the shelf for observation under ambient conditions. A second set of baked samples from each batch was placed in an incubator oven for observation at controlled temperatures from 90° to 98° F. The shelf test samples began to support a white mold growth in 7 to 10 days from the commencement of the test. The incubator test samples began to support a white mold growth in about 5 days from the commencement of the test. In each instance, there was selective inhibition of the growth of green and dark colored mold on the bread samples.

EXAMPLE II

This example illustrates the selective inhibition of green and dark colored mold growth on bread prepared from wheat treated in accordance with the crystalline fructose embodiment of this invention.

The crystalline fructose used in this example was supplied by Hoffman-LaRoche Inc., Nutley, N.J. 07001 who noted the following properties and characteristics for the product:

| Crystalline Fructose | |
|---|---|
| Appearance | White Crystalline Powder |
| Empirical Formula | $C_6H_{12}O_6$ |
| Molecular Weight | 180.6 |
| Melting Point | 102–105° C. |
| Density | 1.60gm/cubic centimeter |
| Caloric Value | 3.8 cal/gm |
| Assay | Min. 99.5 |
| Moisture | Max. 0.25 |
| Ash | Max. 0.01 |
| Hydroxymethylfurfural | Max. 50ppm |
| pH of Aq. Soln. | Ca 5.4 |
| Ave. Crystal Size | 0.25/0.50mm |

An initial soaking mixture was prepared by adding 8 pounds of spring wheat kernels and 0.125 pound of crystalline fructose to a holding vat containing 10 pounds of water. The pH of the water following the addition of the wheat kernels and the crystalline fructose was approximately 5. The initial soaking mixture was maintained at a temperature from 72° to 84° F. for an initial soaking period which lasted 10 to 12 hours.

Upon completion of the initial soaking period, 0.004 pound of bromelin powder having an enzyme potency of 1600 gelatin digestive units per gram was added to the initial soaking mixture to define a final soaking mixture. The final soaking mixture was maintained at a temperature from 72° to 84° F. for a final soaking period of about 12 hours. At the end of the final soaking period, the liquid was strained from the wheat kernels; and the wheat kernels were chopped and extruded to form a dough like mass weighing approximately 13 pounds.

Ten batches of ground wheat dough were prepared by this procedure. Each batch was processed into finished loaves of bread and evaluated for mold growth in accordance with the procedure described in Example I. The test results were comparable to those in Example I in that the samples, at the time specified in Example I, supported a white mold growth but selectively inhibited the growth of green and dark colored mold.

EXAMPLE III

This example demonstrates that the use of either liquid grape concentrate or crystalline fructose in the wheat treating process of this invention is critical to the selective inhibition of green or dark colored mold growth on baked products prepared from the treated wheat in that the substitution of closely related compositions for these critical ingredients does not selectively inhibit this mold growth.

A series of runs were carried out wherein the initial soaking mixtures contained the ingredients and concentrations set forth in Table I:

TABLE I

| Initial Soaking Mixture | Run Number | | | | | | |
|---|---|---|---|---|---|---|---|
| | 1 | 2 | 3 | 4 | 5 | 6 | 7 |
| Water, lbs. | 10 | 10 | 10 | 10 | 10 | 10 | 10 |
| Spring wheat, lbs. | 8 | 8 | 8 | 8 | 8 | 8 | 8 |
| Honey, lbs. | 1 | | | | | | |
| Liquid apple concentrate, lbs. | | 1 | | | | | |
| Liquid pear concentrate, lbs. | | | 1 | | | | |
| Fructose corn syrup, lbs. | | | | 1 | | | |
| Liquid grape concentrate, lbs. | | | | | 1 | | |
| Glucose, oz. | | | | | | 6 | |
| Crystalline fructose, oz. | | | | | | | 2 |

The initial soaking mixture for each run was maintained at a temperature from 72° to 84° F. for an initial soaking period which lasted about 12 hours. Upon completion of the initial soaking period, 0.06 ounce of bromelin powder having an enzyme potency of 1600 gelatin digestive units per gram was added to each soaking mixture to define final soaking mixtures which were maintained at a temperature from 72° to 84° F. for about 12 hours. Following the final soaking step for each run, the liquid was strained from the wheat kernels which were chopped and extruded to form dough like masses weighing approximately 13 pounds each. Each batch was then processed into 11 finished loaves of bread and evaluated for mold growth in accordance with the procedure described in Example I. The results are set forth in Table II:

TABLE II

| Run No. | Treating Agent[1] | Mold Growth | |
|---|---|---|---|
| | | Shelf[2] | Oven Incubator[3] |
| 1 | Honey | Green | Green |
| 2 | Liquid apple concentrate | Green | Green |
| 3 | Liquid pear concentrate | Green | Green |
| 4 | Fructose corn syrup | Green[4] | Green[4] |
| 5 | Liquid grape concentrate | White | White |
| 6 | Glucose | Green | Green |
| 7 | Crystalline fructose | White | White |

[1]In the initial soaking mixture
[2]Growth at 7–10 days
[3]Growth at 5 days
[4]Some white

EXAMPLE IV

Wheat sources in the United States generally have a protein content from about 7 to about 18 wt.% as follows: spring wheat protein content is from about 14 to 18 wt.%; hard red wheat protein content is from about 11 to 13 wt.%; and soft white wheat protein content is from about 7 to 10 wt.%.

This example shows that wheat sources of lower protein content require longer soaking/treating times than wheat sources of higher protein content in order to attain the preferred results of this invention with respect to the selected inhibition of green and dark colored mold growth on baked products prepared from the treated wheat.

A series of runs were carried out with hard red wheat (protein content 12 wt.%) and soft white wheat (protein content 10 wt.%). The ingredients and the soaking time and temperature for the initial soaking mixtures together with the bread mix ingredients, bake time and temperature and the resulting mold color on tests loaves of bread are set forth in Table III.

TABLE III

| | Run Number | | | |
|---|---|---|---|---|
| | 1 | 2 | 3 | 4 |
| Initial Soaking Mixture | | | | |
| Hard red wheat, lbs. | 4 | 4 | | |
| Soft white wheat, lbs. | | | 4 | 4 |
| Water, lbs. | 5 | 5 | 5 | 5 |
| Liquid grape concentrate[1], oz. | 2 | 2 | | |
| Crystalline fructose, oz. | | | 0.75 | 0.75 |
| Initial Soaking Times, hrs. | 12 | 12 | 12 | 12 |
| Initial Soaking Temp., °F. | 72–84 | 72–84 | 72–84 | 72–84 |
| Final Soaking Mixture | | | | |
| Liquid bromelin[2] extract,[3] oz. | 0.75 | 0.75 | | |
| Bromelin[2] powder, oz. | | | 0.06 | 0.06 |
| Final Soaking Time, hrs. | 12 | 36 | 36 | 60 |
| Final Soaking Temp., °F. | 72–84 | 72–84 | 72–84 | 72–84 |
| Bread Mix Ingredients | | | | |
| Treated wheat mass, lbs. | 6.75 | 6.75 | 6.875 | 7 |
| Honey, oz. | 2 | 2 | 2 | 2 |
| Soya oil, oz. | 2 | 2 | 2 | 2 |
| Yeast, oz. | 2 | 2 | 2 | 2 |
| Salt, oz. | 1 | 1 | 1 | 1 |
| Bake Time & Temp., min/°F. | 50/400 | 50/400 | 50/400 | 50/400 |
| Bread Mold Color | | | | |
| Shelf test, 7–9 days | Green[4] | White | Green[4] | White |
| Incubator oven, 5 days | Green[4] | White | Green[4] | White |

[1]68% solids
[2]Enzyme potency 1600 GDU/gm
[3]Bromelin conc. 20 wt. %
[4]Some white Each of the initial soaking mixtures of Runs 1 and 2 was prepared by adding 4 pounds of hard red wheat and 2 ounces of liquid grape concentrate to 5 pounds of water. Each of the initial soaking mixtures of Runs 3 and 4 was prepared by adding 4 pounds of soft white wheat and 2 ounces of bromelin powder to 5 pounds of water. The initial soaking mixtures were maintained at a temperature from 72° to 84° F. for about 12 hours, at which time 0.75 ounce of liquid bromelin extract was added to each of Runs 1 and 2 and 0.06 ounce of bromelin powder was added to each of Runs 3 and 4. Run 1 was maintained at a temperature from 72°–84° F. for about 12 hours for a total soaking period of about 24 hours; Run 2 was maintained at a temperature from 72°–84° F. for about 36 hours for a total soaking period of about 48 hours; Run 3 was maintained at a temperature from 72°–84° F. for about 36 hours for a total soaking period of about 48 hours; and Run 4 was maintained at a soaking temperature from 72°–84° F. for about 60 hours for a total soaking period of about 72 hours.

Following the final soaking step for each of Runs 1 through 4, the liquid was strained from the wheat kernels and the wheat kernels were chopped and extruded to form dough like masses weighing from 6 to 7 pounds each. Each batch was mixed with honey, soya oil, yeast and salt and processed into 5 loaves of bread by baking the mix at about 400° F. for about 50 minutes. The baked bread was cooled, wrapped and evaluated for mold growth by placing wrapped samples on the shelf as well as in an incubator oven at a controlled temperature from 90° to 98° F. The shelf test samples began to support a mold growth in 7-9 days while the incubator oven samples began to support a mold growth in 5 days. In Run 1, which utilized hard red wheat (12% protein) and had a total soaking time of 24 hours, the mold growth was green with some white. In Run 2, which was identical to Run 1 except that the total soaking time was 48 hours, the mold growth was white and there was selected inhibition of green mold growth. In Run 3, which utilized soft white wheat (10% protein) and had a total soaking time of 48 hours, the mold growth was green with some white. In Run 4, which was identical to Run 3 except that the total soaking time was 72 hours, the mold growth was white and there was selected inhibition of green mold growth.

EXAMPLE V

This example shows the type of mold growth produced on bread prepared from spring wheat which has been subjected to soaking without the use of either liquid grape concentrate or proteolytic enzyme.

Eight pounds of spring wheat kernels were added to a holding vat containing 10 pounds of water and the resulting mixture was maintained at a temperature from 72° to 84° F. for 24 hours. At the end of the soaking period, the liquid was strained from the wheat kernels.

The soaked wheat kernels were then ground and extruded to produce a dough like mass. Bread was made from this ground wheat mass by the addition thereto of some of the strained liquid together with yeast, honey and salt. The resulting bread was evaluated for characteristics of mold growth and it was observed that a green mold growth was produced.

EXAMPLE VI

This example shows the effect on mold growth produced on bread from an ingredient mix continaing untreated whole wheat flour in combination with whole wheat flour ground from spring wheat kernels treated in accordance with the liquid grape concentrate embodiment of this invention.

To ground wheat mass prepared in accordance with the procedure described in Example I, there was added strained liquid from the soaking step, untreated whole wheat flour, yeast, honey and salt and the resulting mix was processed and baked by conventional procedure to produce bread products. The resulting bread was evaluated for characteristics of mold growth and it was observed that both white and green mold growth was produced.

It has been reported by food sensitive persons, who were diagnosed as being sensitive to wheat, that their allergy symptoms were substantially reduced when they consumed bread prepared from wheat which had been treated in accordance with the method of this invention.

In view of the foregoing description and examples, it will become apparent to those of ordinary skill in the art that equivalent modifications thereof may be made without departing from the spirit and scope of this invention.

That which is claimed is:

1. A method of treating cereal grain intended for use in the preparation of consumable products, which comprises:

forming an initial soaking mixture containing water, cereal grain and a member selected from the group consisting of (a) liquid grape concentrate and (b) crystalline fructose, said cereal grain being present in an amount from about 40 to about 60 wt.%, said liquid grape concentrate having a solids content from about 60 to about 75 wt.% and being present in an amount from about 3 to about 8 wt.%, said crystalline fructose being present in an amount from about 0.55 to about 0.85 wt.%, and said water being present in an amount to make 100 wt.%;

maintaining said initial soaking mixture at a temperature from about 72° to about 84° F. for an initial soaking period of about 10 to about 16 hours;

adding proteolytic enzyme to said initial soaking mixture upon completion of said initial soaking period to define a final soaking mixture and maintaining said final soaking mixture at a temperature from about 72° to about 84° F. for a final soaking period of about 10 to about 62 hours, said proteolytic enzyme being a member selected from the group consisting of (a) bromelin and (b) papain, said bromelin having an enzyme potency of about 1,400 to about 1,600 gelatin digestive units per gram and being present in the final soaking mixture in an amount from about 0.016 to about 0.024 wt.% and said papain having an enzyme potency of about 2,800 to about 3,000 gelatin digestive units per gram and being present in the final soaking mixture in an amount from about 0.008 to about 0.012 wt.%; and separating said cereal grain from said final soaking mixture.

2. The method of claim 1 wherein the concentration of cereal grain in the initial soaking mixture is from about 45 to about 55 wt.%.

3. The method of claim 1 wherein the concentration of the liquid grape concentrate in the initial soaking mixture is from about 4 to about 6 wt.% and the solids content of said liquid grape concentrate is from about 65 to about 70 wt.%.

4. The method of claim 1 wherein the crystalline fructose has a fructose content of at least about 99.5 wt.% and a moisture content of not more than about 0.25 wt.%.

5. The method of claim 1 wherein the initial soaking mixture contains water, cereal grain and crystalline fructose and the proteolytic enzyme added to the final soaking mixture is bromelin.

6. The method of claim 1 wherein the initial soaking mixture contains water, cereal grain and liquid grape concentrate and the proteolytic enzyme added to the final soaking mixture is bromelin.

7. The method of claim 1 wherein the cereal grain is spring wheat and the final soaking period is from about 10 to about 20 hours.

8. The method of claim 1 wherein the cereal grain is hard red wheat and the final soaking period is from about 36 to about 48 hours.

9. The method of claim 1 wherein the cereal grain is soft white wheat and the final soaking period is from about 56 to about 62 hours.

10. The method of claim 1 wherein the final soaking mixture includes from about 0.1 to about 0.5 wt.% of amylolytic enzyme having an enzyme potency from about 1,800 to about 2,000 starch digestive units per gram.

* * * * *